(12) United States Patent
Nishio

(10) Patent No.: US 11,172,138 B2
(45) Date of Patent: Nov. 9, 2021

(54) IMAGE CAPTURE APPARATUS CAPABLE OF PERFORMING HDR COMBINATION, METHOD OF CONTROLLING SAME, AND STORAGE MEDIUM

(71) Applicant: CANON KABUSHIKI KAISHA, Tokyo (JP)

(72) Inventor: Taisuke Nishio, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/575,815

(22) Filed: Sep. 19, 2019

(65) Prior Publication Data

US 2020/0099840 A1 Mar. 26, 2020

(30) Foreign Application Priority Data

Sep. 26, 2018 (JP) .............................. JP2018-180668

(51) Int. Cl.
*H04N 5/235* (2006.01)
*H04N 5/232* (2006.01)

(52) U.S. Cl.
CPC ....... *H04N 5/2352* (2013.01); *H04N 5/23218* (2018.08); *H04N 5/23254* (2013.01); *H04N 5/2351* (2013.01); *H04N 5/2353* (2013.01); *H04N 5/2355* (2013.01)

(58) Field of Classification Search
CPC ............. H04N 5/2352; H04N 5/23218; H04N 5/23254; H04N 5/2351; H04N 5/2353; H04N 5/2355
See application file for complete search history.

(56) References Cited

U.S. PATENT DOCUMENTS

| 7,602,418 | B2 | 10/2009 | Border et al. |
| 8,576,295 | B2 | 11/2013 | Ito |
| 8,779,341 | B2 | 7/2014 | Mine |
| 2008/0088711 | A1 | 4/2008 | Border et al. |
| 2010/0321539 | A1 | 12/2010 | Ito |

(Continued)

FOREIGN PATENT DOCUMENTS

| JP | 2011-004353 A | 1/2011 |
| JP | 2012-257126 A | 12/2012 |
| WO | 2008/045239 A2 | 4/2008 |

OTHER PUBLICATIONS

Feb. 25, 2020 European Search Report in European Patent Appln. No. 19199185.0.

*Primary Examiner* — Ahmed A Berhan
(74) *Attorney, Agent, or Firm* — Venable LLP

(57) ABSTRACT

An image capture apparatus capable of increasing the width by which the dynamic range is expanded by HDR combination, according to whether a moving object exists or not, while preventing occurrence of ghost artifacts or the like, caused by improper combination. An image capture section performs image capture operations with a plurality of different exposure amounts for each frame to thereby generate a plurality of captured images so as to perform HDR combination. An exposure controller sets the plurality of different exposure amounts for the image capture section. A moving object detection section detects a moving object existing in at least one of the plurality of captured images. The exposure controller adjusts the plurality of different exposure amounts according to whether or not a moving object is detected by the moving object detection section.

13 Claims, 14 Drawing Sheets

(56) References Cited

U.S. PATENT DOCUMENTS

| | | | |
|---|---|---|---|
| 2012/0249830 A1* | 10/2012 | Tsubaki | G06T 5/50 348/229.1 |
| 2012/0281133 A1* | 11/2012 | Kurita | G06T 5/007 348/362 |
| 2012/0312960 A1 | 12/2012 | Mine | |
| 2013/0286246 A1 | 10/2013 | Matsuoka | |
| 2015/0296116 A1 | 10/2015 | Tsuzuki | |

* cited by examiner

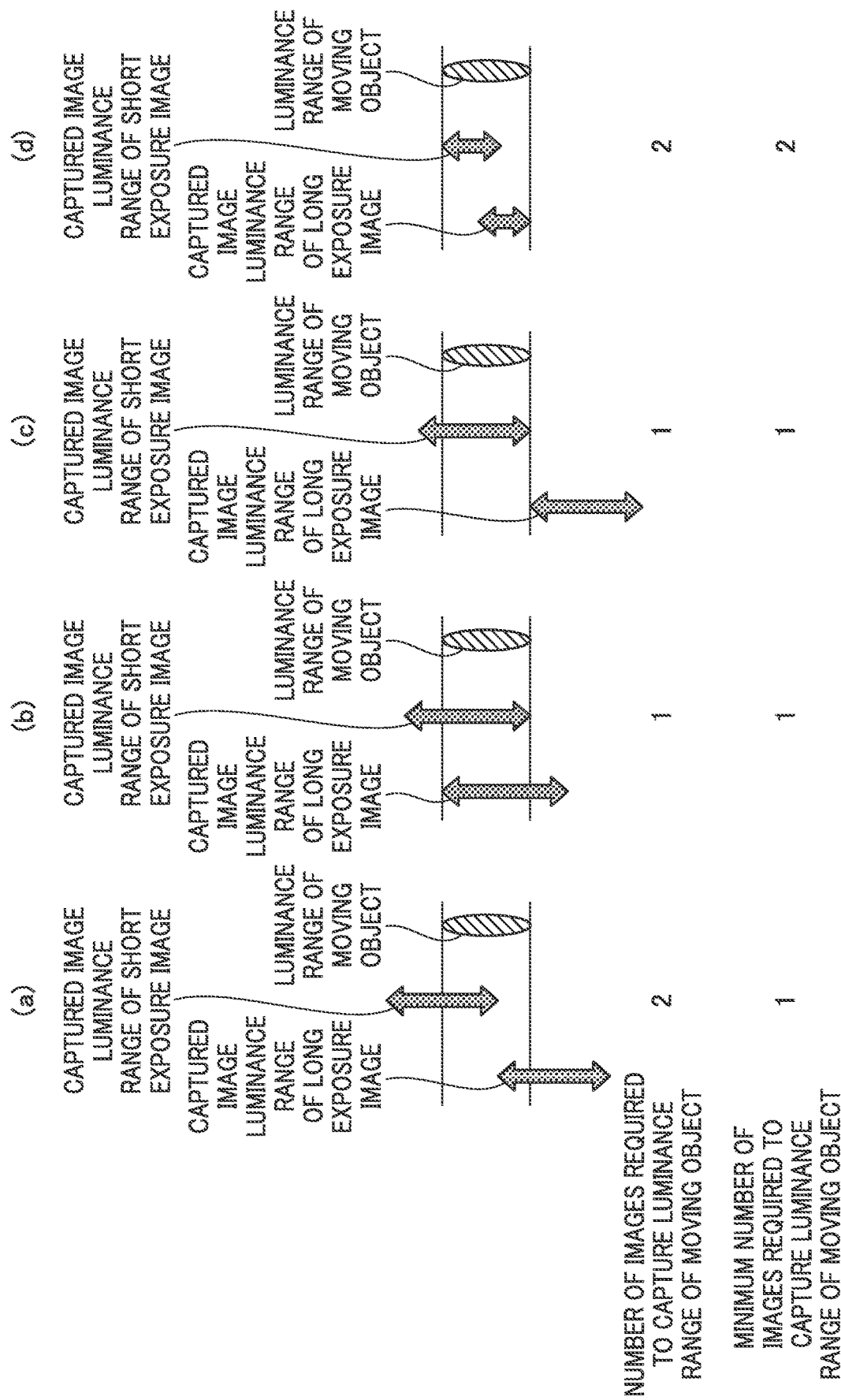

IMAGE CAPTURE APPARATUS CAPABLE OF PERFORMING HDR COMBINATION, METHOD OF CONTROLLING SAME, AND STORAGE MEDIUM

BACKGROUND OF THE INVENTION

Field of the Invention

The present invention relates to an image capture apparatus, a method of controlling the same, and a storage medium, and more particularly to an image capture apparatus that is configured to capture a plurality of images which are different in exposure and are used for high dynamic range (HDR) combination, a method of controlling the same, and a storage medium.

Description of the Related Art

Conventionally, there has been known a technique of high dynamic range (HDR) combination in which a plurality of images different in exposure are combined to increase a dynamic range of a resultant captured image.

In HDR combination, a plurality of images captured in temporally different timings are combined into one image, and hence if a moving object exists in the images, or if a camera is moved while images to be combined are being captured, the images may not be properly combined. That is, combining images of an object, which are different in position of the object, sometimes causes degradation of image quality, such as occurrence of ghost artifacts.

For example, Japanese Laid-Open Patent Publication (Kokai) No. 2012-257126 describes that in a case where an object is tracked between a plurality of images to be combined, correlation between the plurality of images is reduced because of different exposures, so that there is a possibility of being incapable of tracking the object. To prevent this, a technique is disclosed therein in which in a mode for detecting a predetermined area (area of a tracking target), image capture is controlled such that a difference in the exposure amount is reduced between the plurality of images for HDR combination.

Japanese Laid-Open Patent Publication (Kokai) No. 2011-004353 describes that it is necessary to accurately calculate a position where a plurality of images for combination are superimposed one upon another. To this end, there is disclosed a technique for identifying a common area in each of a plurality of images for HDR combination and correcting a positional displacement between the images when they are superposed one upon another such that respective common areas in the respective superposed images coincide with each other.

However, in the above-described conventional techniques disclosed in Japanese Laid-Open Patent Publication (Kokai) No. 2012-257126 and Japanese Laid-Open Patent Publication (Kokai) No. 2011-004353, it is necessary to capture an image of a common object luminance area between the plurality of images for HDR combination, regardless of whether or not a moving object exists in the images. In other words, even in a case where no moving object exists, and hence there is little possibility of ghost artifacts or the like caused by improper combination, it is impossible to increase the exposure difference between the plurality of images for HDR combination, which results in a decrease in the width by which the dynamic range is expanded by HDR combination.

SUMMARY OF THE INVENTION

The present invention provides an image capture apparatus that is capable of increasing the width by which the dynamic range is expanded by HDR combination, according to whether a moving object exists or not, while preventing occurrence of ghost artifacts or the like, caused by improper combination, a method of controlling the same, and a storage medium.

In a first aspect of the present invention, there is provided an image capture apparatus including an image capture section configured to perform image capture operations with a plurality of different exposure amounts for each frame, to thereby generate a plurality of captured images so as to perform HDR combination, and at least one processor or circuit configured to perform the operations of the following units: a setting unit configured to set the plurality of different exposure amounts for the image capture section, and a moving object detection unit configured to detect a moving object existing in at least one of the plurality of captured images, wherein the setting unit adjusts the plurality of different exposure amounts according to whether or not a moving object is detected by the moving object detection unit.

In a second aspect of the present invention, there is provided a method of controlling an image capture apparatus including an image capture section configured to perform image capture operations with a plurality of different exposure amounts for each frame, to thereby generate a plurality of captured images so as to perform HDR combination, comprising setting the plurality of different exposure amounts for the image capture section, detecting a moving object existing in at least one of the plurality of captured images, and adjusting the plurality of different exposure amounts according to whether or not a moving object is detected.

In a third aspect of the present invention, there is provided a non-transitory computer-readable storage medium storing a computer-executable program for executing a method of controlling an image capture apparatus including an image capture section configured to perform image capture operations with a plurality of different exposure amounts for each frame, to thereby generate a plurality of captured images so as to perform HDR combination, wherein the method comprises setting the plurality of different exposure amounts for the image capture section, detecting a moving object existing in at least one of the plurality of captured images, and adjusting the plurality of different exposure amounts according to whether or not a moving object is detected.

According to the present invention, it is possible to increasing the width by which the dynamic range is expanded by HDR combination, according to whether a moving object exists or not, while preventing occurrence of ghost artifacts or the like, caused by improper combination.

Further features of the present invention will become apparent from the following description of exemplary embodiments (with reference to the attached drawings).

BRIEF DESCRIPTION OF THE DRAWINGS

FIG. 6 is a diagram useful in explaining a method of calculating the exposure level difference by the image capture apparatus of the present invention in the case of the variation in FIG. 5.

DESCRIPTION OF THE EMBODIMENTS

The present invention will now be described in detail below with reference to the accompanying drawings showing embodiments thereof.

An image capture apparatus 100 according to a first embodiment of the present invention will be described below with reference to FIG. 1.

Figure 1:
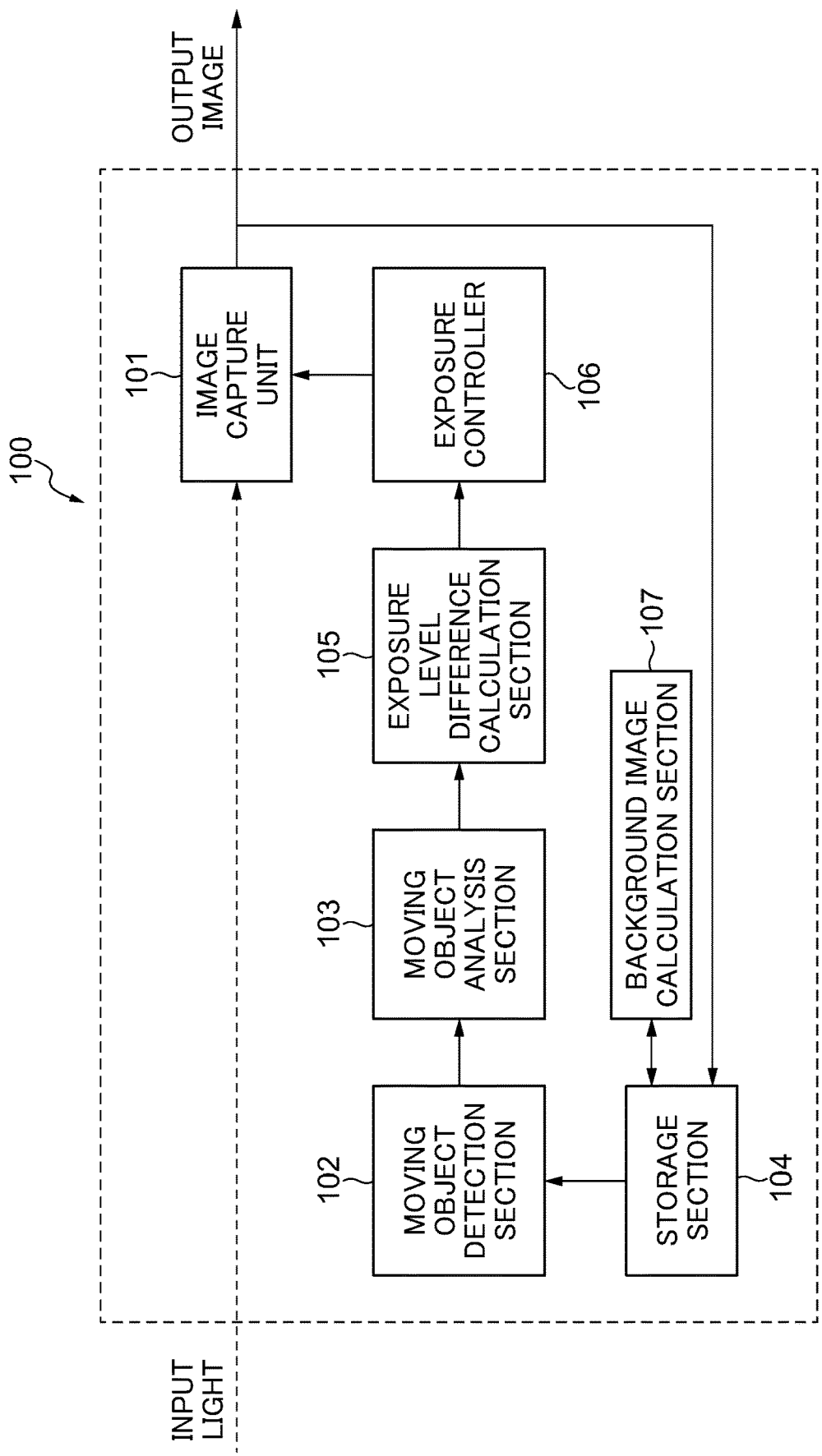
FIG. 1 a control block diagram of an image capture apparatus according to a first embodiment of the present invention.

Referring to FIG. 1, the image capture apparatus 100 includes an image capture unit (image capture section) 101, a moving object detection section 102, a moving object analysis section 103, a storage section 104, an exposure level difference calculation section 105, an exposure controller (setting unit) 106, and a background image calculation section 107.

The image capture unit 101 performs, for each frame, image capture operations with a plurality of different exposure amounts, determined based on a plurality of exposure control parameters acquired from the exposure controller 106, and generates a plurality of captured image data items. Then, the image capture unit 101 outputs the plurality of captured image data items to an external apparatus as output images of the image capture apparatus 100, and outputs at least one of the plurality of captured image data items to the storage section 104. The external apparatus generates an HDR-combined image by combining the plurality of received captured image data items.

Note that in the present embodiment described below, the description is given of a case where the number of the plurality of captured image data items, generated by the image capture operations with the plurality of different exposure amounts for each frame, is two. More specifically, an image indicated by image data captured with a lower shutter speed and a larger exposure amount is hereinafter referred to as a long exposure image, and an image indicated by image data captured with a higher shutter speed and a smaller exposure amount is hereinafter referred to as a short exposure image.

The moving object detection section 102 calculates, whenever captured image data of one of a long exposure image and a short exposure image is generated, a difference between an image indicated by the generated captured image data, and a background image, referred to hereinafter, acquired from the storage section 104. After that, the moving object detection section 102 detects the difference as an object which is moving (moving object), existing in the image indicated by the generated captured image data. Then, the moving object detection section 102 outputs pixel values of the detected moving object to the moving object analysis section 103. Note that a moving object may be detected by using not the background image, but an image indicated by image data captured in the same scene with the same exposure amount in a frame preceding the current frame.

The moving object analysis section 103 (moving object analysis unit) calculates a feature amount of the moving object based on the pixel values of the moving object detected by the moving object detection section 102, and outputs the calculated feature amount to the exposure level difference calculation section 105. The feature amount of the moving object is e.g. a luminance histogram of the moving object.

The background image calculation section 107 (background image calculation unit) acquires captured image data of the same scene, generated by the image capture unit 101 over a predetermined time period in the past, from the storage section 104, and calculates the time average of the acquired image data as background image data. This background image data is output from the background image calculation section 107 to the storage section 104.

The storage section 104 stores a plurality of image data items captured in the same scene, and outputs the plurality of captured image data items stored therein to the moving object detection section 102. Examples of the plurality of captured image data items output from the storage section 104 to the moving object detection section 102 include the background image data output from the background image calculation section 107 and a plurality of captured image data of the preceding frame.

The exposure level difference calculation section 105 calculates, when the image capture unit 101 performs a plurality of image capture operations for each frame, a plurality of exposure amounts (exposure level differences) for respective image capture operations, based on the feature amount of the moving object, calculated by the moving object analysis section 103, and outputs the calculated exposure amounts to the exposure controller 106.

The exposure controller 106 calculates, based on the plurality of exposure amounts output from the exposure level difference calculation section 105, a plurality of exposure control parameters corresponding to the exposure amounts, and outputs the plurality of calculated exposure control parameters to the image capture unit 101.

An exposure level difference calculation reflection process performed by the image capture apparatus 100 according to the present embodiment will be described with reference to FIG. 2.

Figure 2:
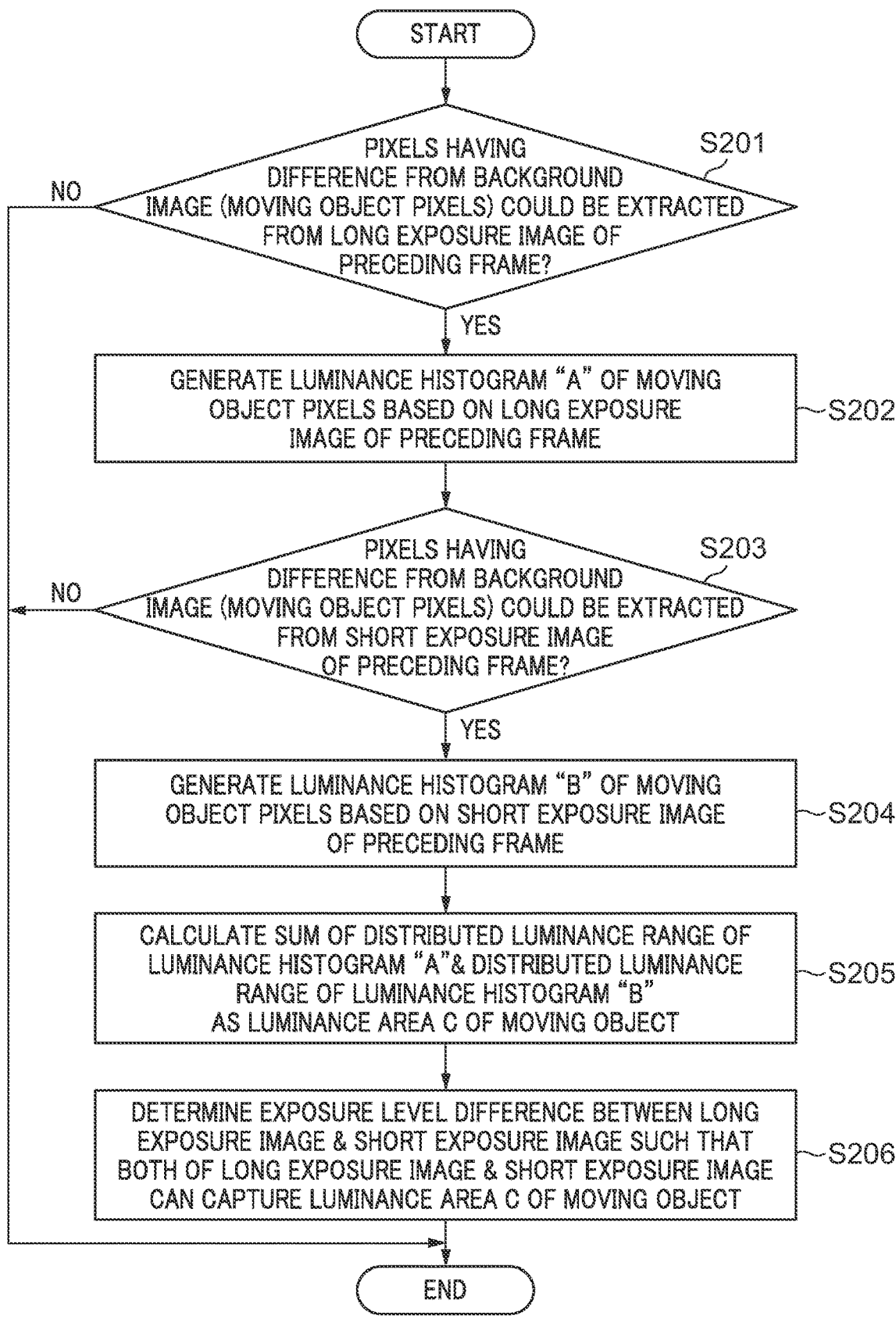
FIG. 2 is a flowchart of an exposure level difference calculation reflection process according to the first embodiment.

Referring to FIG. 2, first, in a step S201, the moving object detection section 102 acquires data of a background image and a long exposure image of the preceding frame from the storage section 104. After that, the moving object detection section 102 determines whether or not pixels, having a difference from the background image (moving object pixels), could be extracted from the long exposure image of the preceding frame, and if the moving object pixels could be extracted, the process proceeds to a step S202. On the other hand, if the moving object pixels could not be extracted, an exposure level difference between exposure for capturing a long exposure image and exposure for capturing a short exposure image is set such that a luminance overlapping range between the long exposure image and the short exposure image in the current frame is eliminated, followed by terminating the present process. Note that the first frame at the start of the present process has no preceding frame, and hence the step S201 is executed with respect to the second and subsequent frames.

In the step S202, the moving object analysis section 103 generates a luminance histogram A of the moving object pixels extracted from the long exposure image of the preceding frame in the step S201.

In a step S203, the moving object detection section 102 acquires data of the background image and a short exposure image of the preceding frame from the storage section 104, and determines whether or not pixels, having a difference from the background image (moving object pixels), could be extracted from the short exposure image of the preceding frame, and if the moving object pixels could be extracted, the process proceeds to a step S204. On the other hand, if the moving object pixels could not be extracted, an exposure level difference between exposure for capturing a long exposure image and exposure for capturing a short exposure image is set such that a luminance overlapping range between the long exposure image and the short exposure image in the current frame is eliminated, followed by terminating the present process.

In the step S204, the moving object analysis section 103 generates a luminance histogram B of the moving object pixels extracted from the short exposure image of the preceding frame in the step S203.

In a step S205, the moving object analysis section 103 calculates a sum of a luminance area having a predetermined frequency value or more in the luminance histogram A and a luminance area having a predetermined frequency value or more in the luminance histogram B, as a luminance area C of the moving object.

In a step S206, the exposure level difference calculation section 105 calculates an exposure level difference between exposure for capturing a long exposure image and exposure for capturing a short exposure image, which is to be reflected on the current frame, so as to make it possible to capture the luminance area C in both of the long exposure image and the short exposure image, followed by terminating the present process.

Next, an example of a sequence for processing an exposure level difference calculation frame as the preceding frame in FIG. 2, and a sequence for processing an exposure level difference reflection frame as the current frame in FIG. 2 will be described with reference to FIG. 3.

Figure 3:
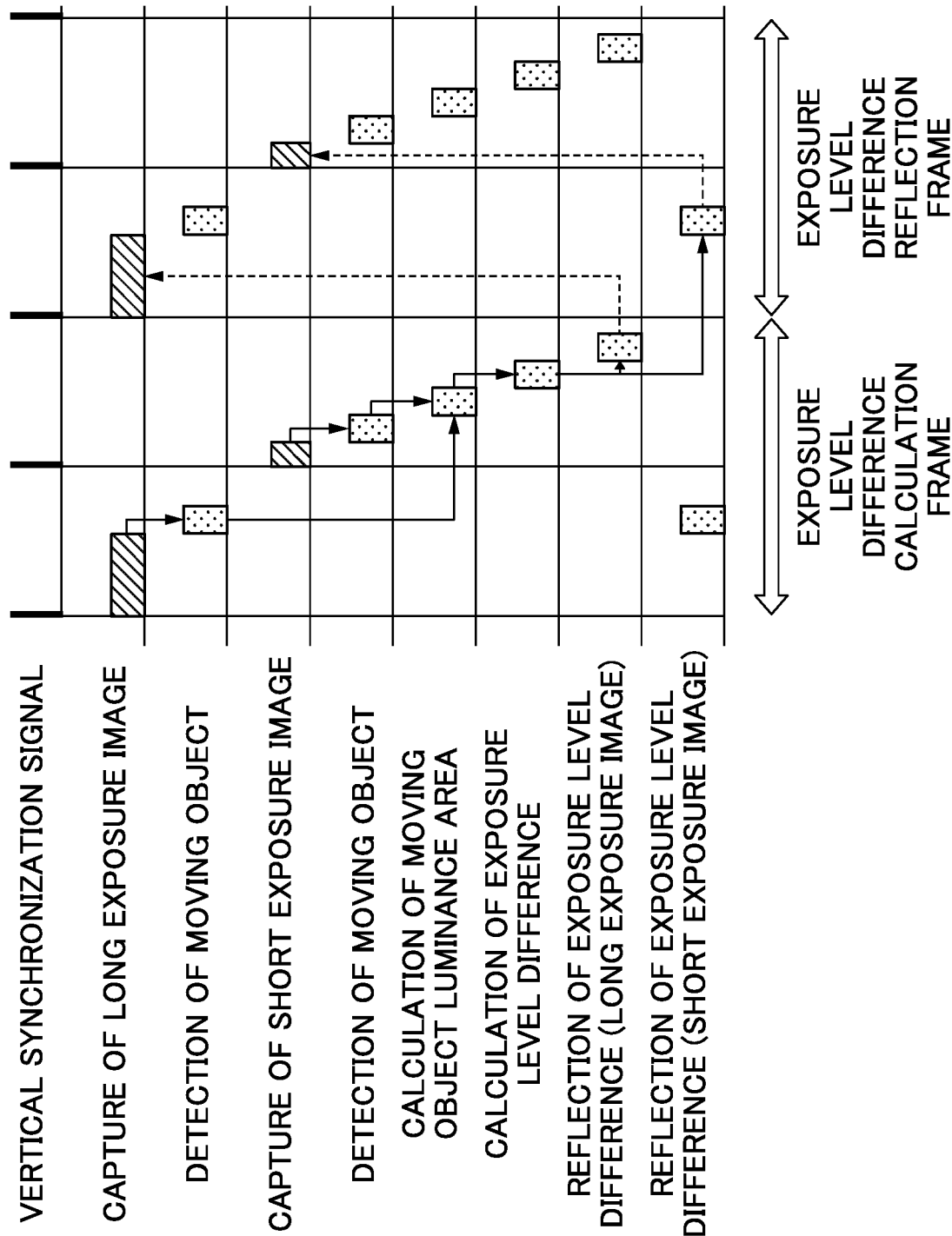
FIG. 3 is a diagram showing an example of a sequence for processing an exposure level difference calculation frame as a preceding frame in the process in FIG. 2 and a sequence for processing an exposure level difference reflection frame as a current frame in the process in FIG. 2.

As shown in FIG. 3, first, a moving object is detected from a long exposure image captured in an exposure level difference calculation frame as the preceding frame in FIG. 2, and further, a moving object is detected from a short exposure image captured in the exposure level difference calculation frame. Next, a moving object luminance area is calculated by integrating these results of the moving object detection, and exposure amounts (exposure level difference) to be applied when capturing a long exposure image and a short exposure image in an exposure level difference reflection frame as the current frame in FIG. 2 are calculated according to the calculated moving object luminance area. Then, the calculated exposure amounts are reflected in the exposure level difference reflection frame.

The advantageous effects provided by the present invention will be described below.

First, exposure level difference control performed in a conventional image capture apparatus will be described with reference to FIGS. 14A and 14B.

Figure 14A:
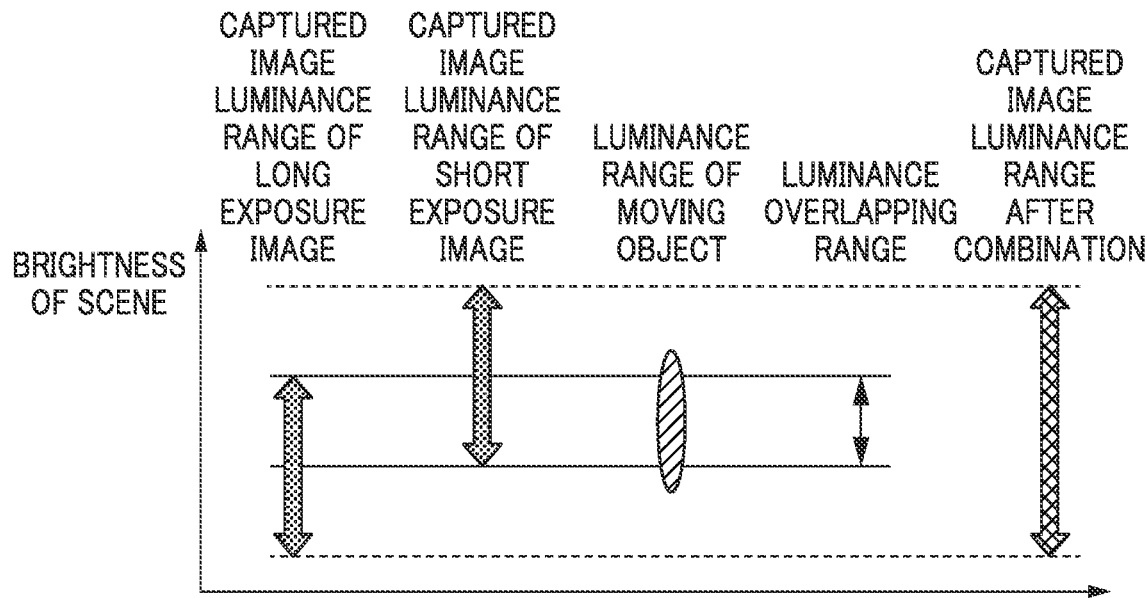
FIGS. 14A and 14B are diagrams useful in explaining exposure level difference control for a conventional image capture apparatus.

As shown in FIG. 14A, the difference between an exposure amount for capturing a long exposure image and an exposure amount for capturing a short exposure image is reduced, in other words, the luminance overlapping range between the long exposure image and the short exposure image is increased. This makes it possible to capture the luminance overlapping range out of the luminance range of the moving object commonly in the long exposure image and the short exposure image. In this case, since the luminance range of the moving object is captured in both of the long exposure image and the short exposure image, it is possible to properly combine the long exposure image and the short exposure image by making use of a difference in the luminance overlapping range between the long exposure image and the short exposure image, and thereby prevent occurrence of ghost artifacts or the like in a portion of the moving object in the resultant combined image. However, the width by which the dynamic range is expanded is reduced by an amount corresponding to the luminance overlapping range.

Figure 14B:
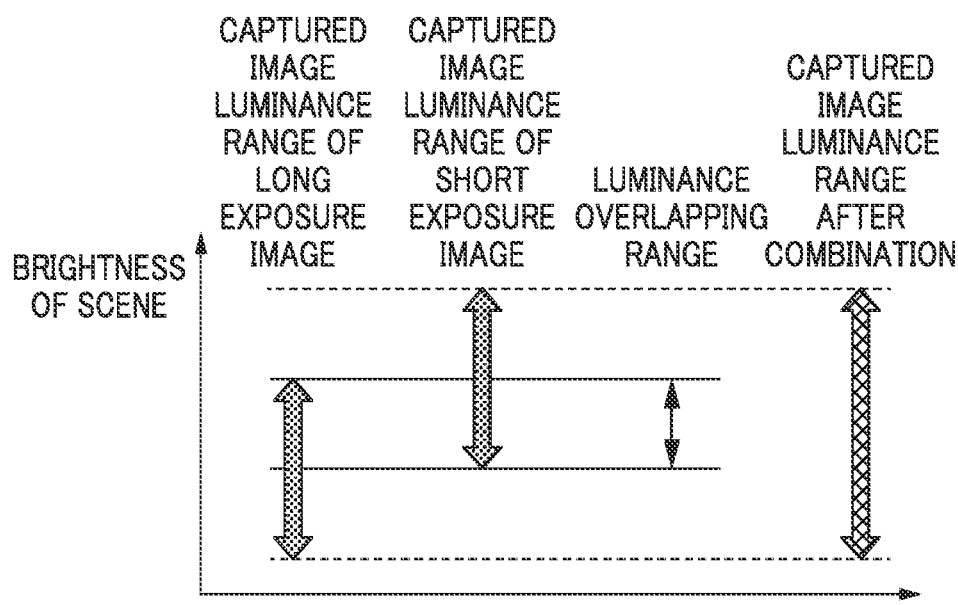

Further, as shown in FIG. 14B, even in a case where no moving object exists in an object image to be captured, the luminance overlapping range is set to a fixed range in the exposure level difference control performed by the conventional image capture apparatus. Therefore, even in a case where no moving object exists and hence there is hardly any possibility that ghost artifacts or the like occur in a combined image obtained by combining the long exposure image and the short exposure image, the width by which the dynamic range is expanded remains reduced.

Further, a proper size of the luminance overlapping range varies with the luminance range of a moving object, and hence excess or insufficiency of the luminance overlapping range can be caused. That is, as shown in FIG. 14A, there is a case where the luminance range of a moving object is wider than the luminance overlapping range and hence the luminance overlapping range is insufficient. In this case, there is a fear that a long exposure image and a short exposure image is improperly combined with respect to portions of the luminance range of the moving object, which are not included in the luminance overlapping range, and ghost artifacts may occur in the resultant combined image. Further, there is a case where the luminance overlapping range is wider than the luminance range of a moving object and hence the luminance overlapping range is excessive. In this case, the width by which the dynamic range is expanded is reduced more than required.

Figure 4A:
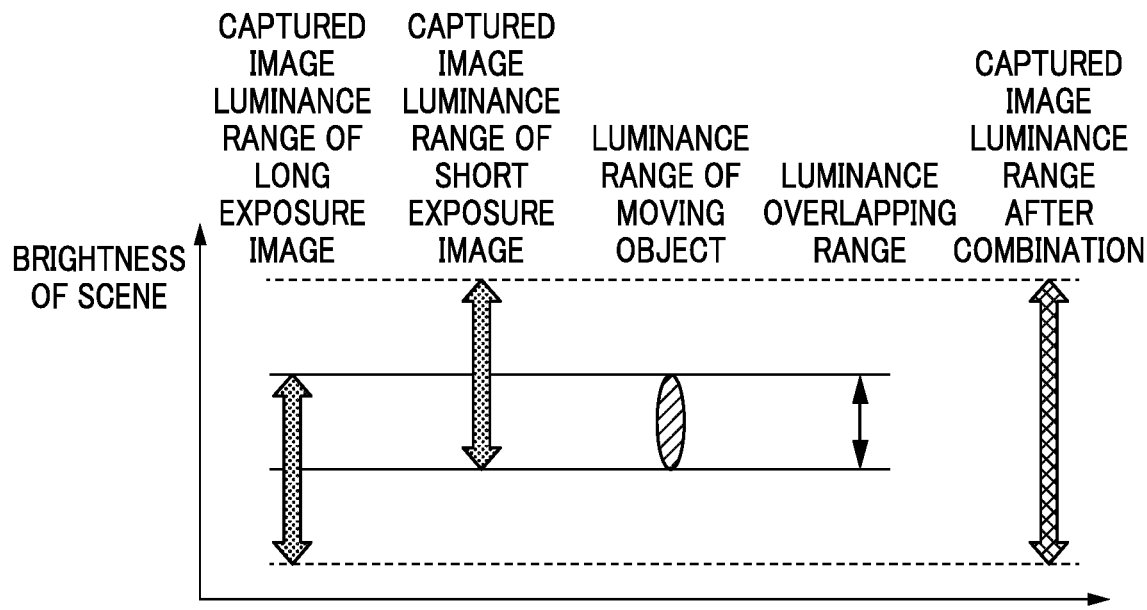
FIGS. 4A and 4B are diagrams useful in explaining exposure level difference control for the image capture apparatus according to the first embodiment.
Figure 4B:
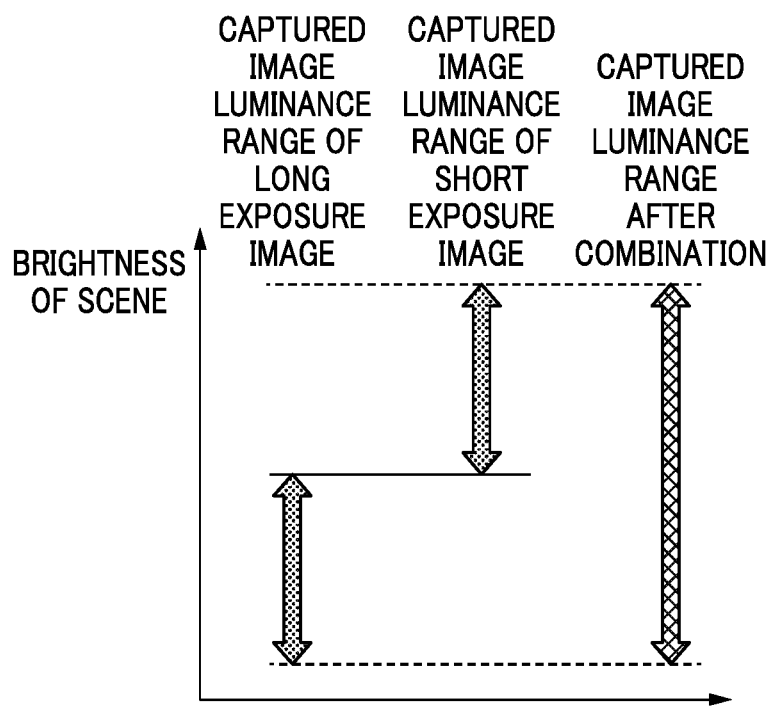

On the other hand, in the exposure level difference control performed by the image capture apparatus 100 according to the present embodiment, a combined image having a dynamic range indicated by a captured image luminance range after combination shown in FIGS. 4A and 4B (hereinafter referred to as the "HDR-combined image") is formed by the external apparatus from the long exposure image and the short exposure image of the current frame in FIG. 2. More specifically, as shown in FIG. 4A, in a case where a moving object exists, the luminance range of the moving object (the luminance area C of the moving object, calculated in the step S205 in FIG. 2) is detected from a long exposure image and a short exposure image of the preceding frame. After that, an exposure level difference between exposure for capturing a long exposure image and exposure for a short exposure image of the current frame is calculated such that the luminance range of the long exposure image and the luminance range of the short exposure image overlap over a range corresponding to the luminance range of the moving object. With this, it is possible to prevent generation of an improper HDR-combined image with ghost artifacts or the like in a portion of the moving object, by making use of a difference in the luminance overlapping range between the long exposure image and the short exposure image. However, the captured image luminance range obtained by HDR combination, i.e. the dynamic range of the HDR-combined image is narrowed by this luminance overlapping range. Further, as shown in FIG. 4B, in a case where no moving object exists, there is no possibility of generation of an improper HDR-combined image with ghost artifacts or the like caused thereby. In this case, in the image capture apparatus 100, an exposure level difference between exposure for capturing a long exposure image and exposure for capturing a short exposure image is calculated such that the luminance overlapping range between the long exposure image and the short exposure image is eliminated. This makes it possible to increase the dynamic range of the HDR-combined image to the maximum.

Specifically, the exposure controller 106 adjusts a plurality of different exposure amounts applied to image capture operations for generating a plurality of images (a long exposure image and a short exposure image in the present embodiment) used for HDR combination, according to whether or not a moving object is detected by the moving object detection section 102. More specifically, in a case where a moving object is detected by the moving object detection section 102, a difference between the maximum amount (the exposure amount for capturing a long exposure image in the present embodiment) and the minimum amount (the exposure amount for capturing a short exposure image in the present embodiment) of the plurality of exposure amounts is made smaller than in a case where no moving object is detected.

Note that although in the present embodiment, the moving object detection section 102 acquires a captured image of a preceding frame and a background image from the storage section 104, calculates differences therebetween, and pixels of the captured image of the preceding frame, from which the differences are calculated, respectively, are set as the pixels from which a moving object is detected, the method of detecting a moving object is not limited to this. For example, differences between a captured image of the second preceding frame and a captured image of the immediately preceding frame may be calculated, and pixels of the captured image of the immediately preceding frame, from which the associated difference are calculated, may be set as the pixels from which a moving object is detected.

Note that although in the present embodiment, the exposure level difference calculation section 105 calculates an exposure level difference between exposure for capturing a long exposure image and exposure for capturing a short exposure image so as to enable a luminance area C of the moving object to be captured in both of the long exposure image and the short exposure image, as shown in FIG. 4A, the method of calculating the exposure level difference is not limited to this.

Figure 5A:
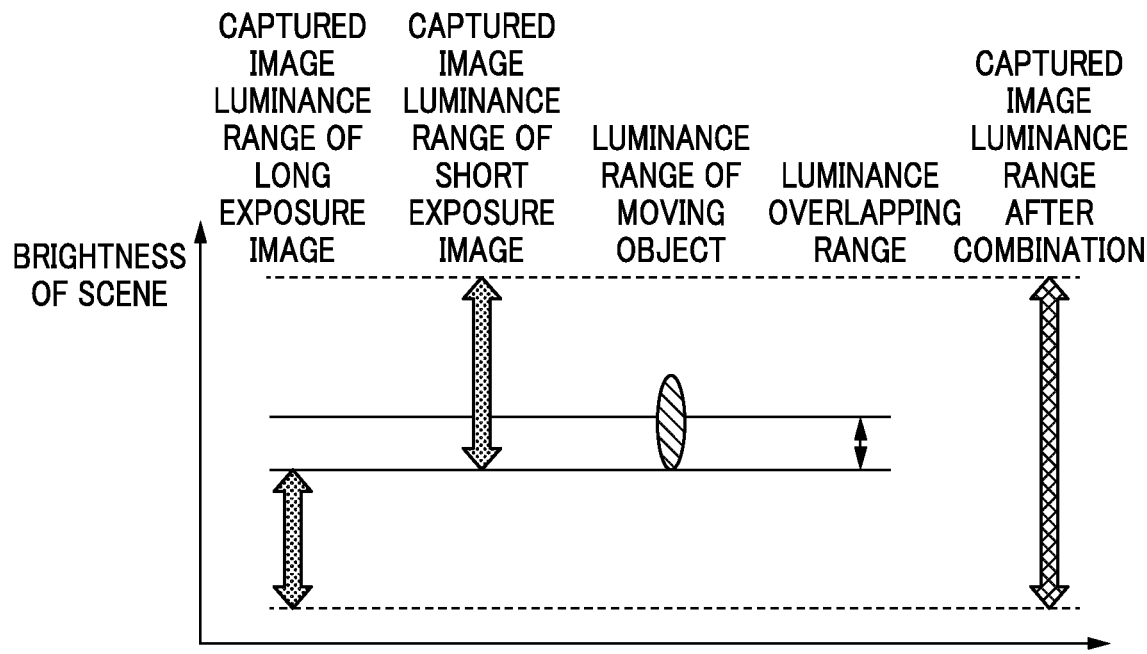
FIGS. 5A and 5B are diagrams useful in explaining a variation of the exposure level difference control for the image capture apparatus according to the first embodiment.
Figure 5B:
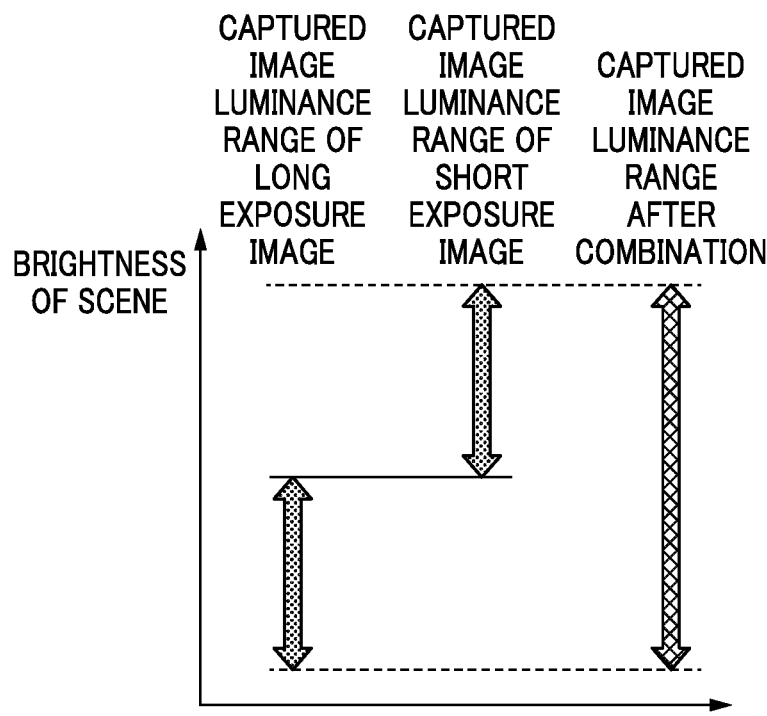

For example, in a case where a moving object is detected, as shown in FIG. 5A, the exposure level difference calculation section 105 may calculate the exposure level difference between exposure for capturing a long exposure image and exposure for capturing a short exposure image in the process in FIG. 2 such that the whole area of the luminance area C of the moving object can be captured in one of the long exposure image and the short exposure image. In other words, the exposure level difference may be calculated such that the number of images required to capture the luminance area C of the moving object becomes minimum.

Additional explanation is given of the description that "the number of images required to capture the luminance area C of the moving object becomes minimum" with reference to FIG. 6. In (a) to (c) in FIG. 6, the captured image luminance range per one captured image is larger than the luminance range of the moving object. Therefore, the minimum number of images required to capture the luminance area C of the moving object is one. On the other hand, in (d) in FIG. 6, the captured image luminance range per one captured image is smaller than the luminance range of the moving object, and hence at least two captured images are required to capture the whole area of the luminance area C of the moving object. Therefore, the minimum number of images required to capture the luminance area C of the moving object is two. Next, in a case where the exposure level difference is as shown in (a) in FIG. 6, the luminance area C of the moving object cannot be covered unless the corresponding captured luminance areas of the short exposure image and the long exposure image are added. Therefore, in the case of the exposure level difference shown in (a) in FIG. 6, the number of images required to capture the luminance area C of the moving object is two. Since the minimum number of images required to capture the luminance area C of the moving object is one in (a) in FIG. 6, the number of images required to capture the luminance area C of the moving object is not the minimum number. On the other hand, in (b) in FIG. 6, the luminance area C of the moving object is covered by one of the long exposure image and the short exposure image. Further, in (c) in FIG. 6, the luminance area C of the moving object is covered only by the short exposure image. Therefore, in the cases of the exposure level differences shown in (b) and (c) in FIG. 6, the number of images required to capture the luminance area C of the moving object is one. Since the minimum number of images required to capture the luminance area C of the moving object is one in (b) and (c) in FIG. 6, the number of images required to capture the luminance area C of the moving object is the minimum number.

As described hereinabove, if images captured at different times are combined for HDR combination, an improper combined image with ghost artifacts or the like in a portion of a moving object may be generated. In other words, if a portion captured only in a long exposure image and a portion captured only in a short exposure image are combined for one moving object, a positional displacement is caused, since the capture time is different between the long exposure image and the short exposure image. Therefore, by generating an HDR-combined output image using only a long exposure image or a short exposure image for the moving object portion, positional displacement is prevented, i.e. generation of an improper combined image with ghost artifacts or the like is prevented. For this reason, by calculating the exposure level difference between exposure for capturing a long exposure image and exposure for capturing a short exposure image such that the whole area of the luminance area C of the moving object can be captured by one of the long exposure image and the short exposure image, it is possible to prevent generation of an improper combined image with ghost artifacts or the like.

As described above, the exposure level difference calculation section 105 may calculate the exposure level difference between exposure for capturing a long exposure image and exposure for capturing a short exposure image such that the luminance area C of the moving object can be captured by both of the long exposure image and the short exposure image. Further, the exposure level difference calculation section 105 may calculate the exposure level difference between exposure for capturing a long exposure image and exposure for capturing a short exposure image such that the whole area of the luminance area C of the moving object can be captured by one of the long exposure image and the short exposure image. Which method, the former method or the latter method, is used to calculate the exposure level difference is not included in the present invention, and may be determined depending on a difference in a mechanism included in an HDR combination unit of an external apparatus, not shown in FIG. 1, for preventing generation of an improper combined image in a moving object portion.

That is, in a case where the mechanism that makes use of a difference between a long exposure image and a short exposure image is included, as disclosed in Japanese Laid-Open Patent Publication (Kokai) No. 2012-257126 and Japanese Laid-Open Patent Publication (Kokai) No. 2011-004353, it is necessary to capture the same luminance area in a long exposure image and a short exposure image, and hence it is better to use the former method.

On the other hand, in a case where the HDR combination unit does not include the mechanism that makes use of a difference between a long exposure image and a short exposure image, it is better to use the latter method. As is clear from comparison between FIG. 4A and FIG. 5A, this is because the latter method makes it possible to increase the dynamic range of a combined image.

Note that in a case where the exposure level difference is largely changed, the exposure level difference calculation section 105 may correct the reference exposure based on the image data of the moving object portion.

For example, in a case where the two images of a long exposure image and a short exposure image are captured for each frame, the exposure level difference calculation section 105 controls the exposure such that the exposure amount for capturing a long exposure image is fixed as the reference exposure, and only the exposure amount for capturing a short exposure image is changed according to a moving object. In this exposure control, when a moving object is detected, the exposure amount for capturing a short exposure image is made closer to the exposure amount for capturing a long exposure image. Therefore, although generation of an improper HDR-combined image in the moving object portion is prevented, the width by which the dynamic range is expanded in the HDR-combined image is narrowed. This may cause saturation of luminance (overexposure) in a high-luminance object portion in the HDR-combined image. Here, in a case where a moving object is included in a high-luminance object portion, overexposure is caused in the moving object portion. That is, with a view to preventing an improper HDR-combined image portion from being generated in the moving object portion, overexposure of the moving object portion is caused, which undesirably prevents improvement of the visibility of the moving object portion. In such a case, to overcome the problem, the exposure is corrected so as to adjust the reference exposure to the moving object portion, whereby it is possible to prevent overexposure of the moving object portion and prevent generation of an improper HDR-combined image.

Note that the exposure level difference calculation section 105 may calculate, in a case where three or more captured images are subjected to HDR combination, the exposure amount for each image capture operation such that only an intermediate exposure amount is changed. In other words, for example, in a case where three captured images are subjected to HDR combination, the exposure is controlled such that the exposure amount is not changed with respect to an image captured with the maximum exposure amount and an image captured with the minimum exposure amount irrespective of a result of detection of a moving object, but is changed with respect to the other captured image than these. The dynamic range of the HDR-combined image becomes a range including and between the luminance range of the image captured with the maximum exposure amount and the luminance range of the image captured with the minimum exposure amount. Therefore, the exposure is controlled such that only the luminance range of an image captured with an intermediate exposure amount is changed while maintaining the luminance range of the image captured with the maximum exposure amount and the luminance range of the image captured with the minimum exposure amount. This makes it possible to prevent an improper HDR-combined image portion from being generated in the moving object portion while maintaining the dynamic range of the HDR-combined image.

Next, an image capture apparatus 100a according to a second embodiment of the present invention and a method of controlling the same will be described with reference to FIG. 7.

In the first embodiment, a moving object is detected by calculating a difference between each of a plurality of captured images to be combined, and a background image or a past captured image. On the other hand, in the present embodiment, a difference between an HDR-combined image formed in a preceding frame and a past HDR-combined image is detected as a moving object. Here, the past HDR-combined image refers to an HDR-combined image generated in the second or further preceding frame, before a background image is generated, and refers to an image obtained by HDR combination of the HDR-combined image generated in the second or further preceding frame and the background image, after the background image is generated.

Figure 7:
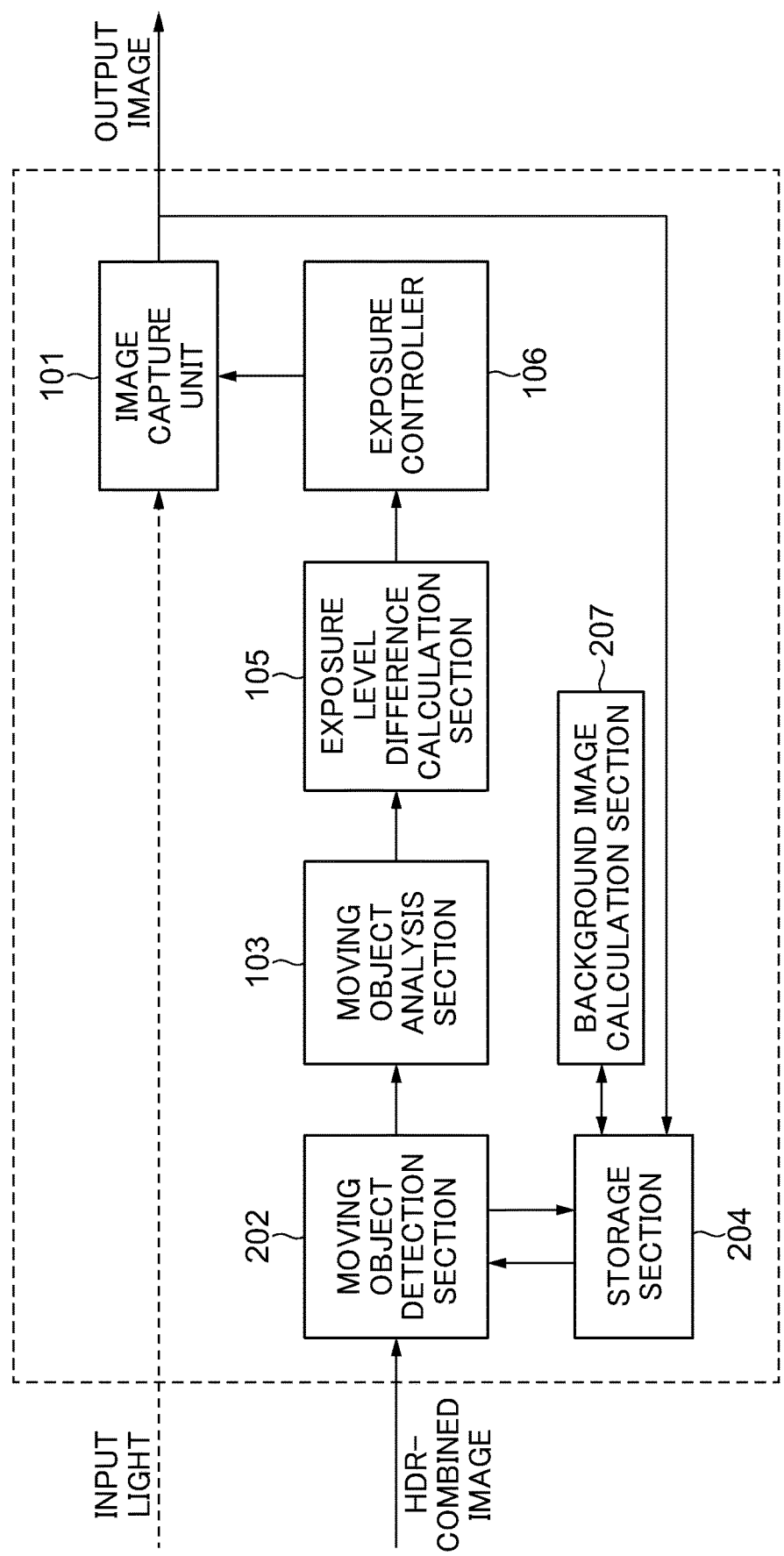
FIG. 7 is a control block diagram of an image capture apparatus according to a second embodiment of the present invention.

FIG. 7 is a control block diagram of the image capture apparatus 100a according to the present embodiment.

Note that the same functional sections as those of the first embodiment are denoted by the same reference numerals and description thereof is omitted.

A moving object detection section 202 acquires an HDR-combined image of a preceding frame from an external apparatus, and detects a moving object by calculating a difference between the acquired HDR-combined image and a past HDR-combined image acquired from a storage section 204. Then, the moving object detection section 202 outputs pixel values of the moving object to the moving object analysis section 103. Further, the moving object detection section 202 outputs the acquired HDR-combined image of the preceding frame to the storage section 204.

The storage section 204 stores a past HDR-combined image in the same scene as the current capturing scene, and outputs the same to the moving object detection section 202. Further, the storage section 204 sequentially stores an HDR-combined image of the immediately preceding frame, which was output from the moving object detection section 202.

A background image calculation section 207 acquires captured image data generated by the image capture unit 101 in a past predetermined time period from the storage section 204 and calculates the time average thereof as the data of the background image. Further, the background image calculation section 207 performs HDR combination of the calculated background image and the HDR-combined image of the second or further preceding frame, and outputs the newly HDR-combined image to the storage section 204 for storage as the past HDR-combined image.

With this configuration, in the present embodiment, a moving object is detected by calculating a difference between the HDR-combined images.

This makes it possible to reduce the number of images to be stored, compared with the image capture apparatus 100 described in the first embodiment which is configured to detect a moving object by calculating a difference between a plurality of images whenever they are captured. That is, although the image capture apparatus 100 described in the first embodiment is required to store a plurality of images captured in the past, the image capture apparatus 100*a* according to the present embodiment is only required to store the past HDR-combined image. With this, it is possible to obtain the advantageous effect of reducing the memory capacity for storing images.

Next, an image capture apparatus 100*b* according to a third embodiment of the present invention and a method of controlling the same will be described with reference to FIG. 8.

Although in the first and second embodiments, a difference between a background image and a captured image, or a difference between an HDR-combined image and a past HDR-combined image is detected as a moving object, in the present embodiment, a moving object is detected based on a user instruction.

Figure 8:
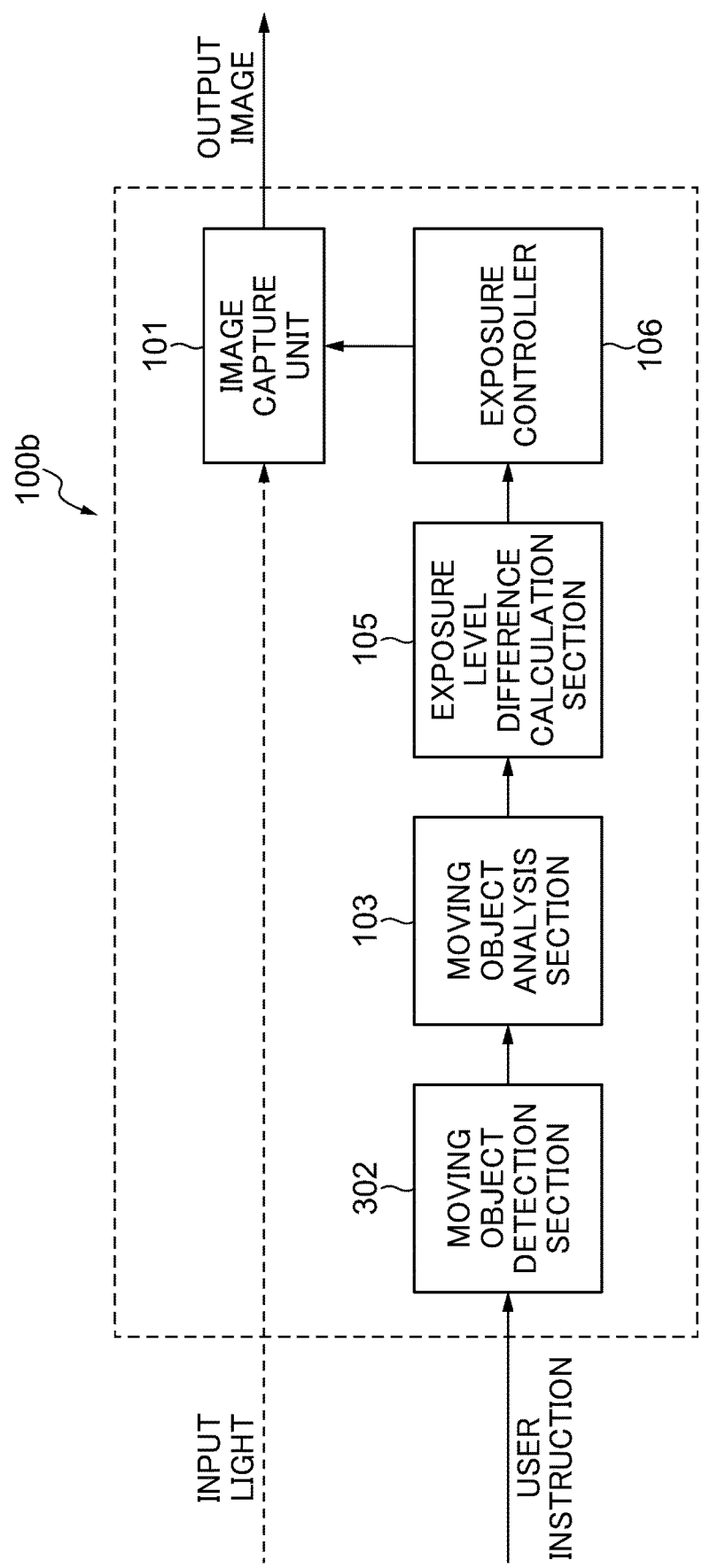
FIG. 8 is a control block diagram of an image capture apparatus according to a third embodiment of the present invention.

FIG. 8 is a control block diagram of the image capture apparatus 100*b* according to the present embodiment.

Note that the same functional sections as those of the above-described embodiments are denoted by the same reference numerals, and description thereof is omitted.

A moving object detection section 302 detects a moving object existing in an image capture angle of view based on a user instruction, and outputs pixel values of the detected moving object in the captured image to the moving object analysis section 103.

More specifically, an external apparatus is provided with an instruction receiving section, not shown, as a user interface for specifying an area designated by a user within the image capture angle of view of the image capture apparatus 100*b* as an area in which a moving object exists. Then, the moving object detection section 302 acquires information on the area designated by the user from the external apparatus as a user instruction, and detects the designated area in the captured image as the moving object.

Examples of the above-described instruction receiving section include a video viewer application which operates on a computer, such as a PC. In this case, a user designates an area in which a moving object exists by operating a mouse or performing a touch operation on a video displaying area displayed by the video viewer application on a screen of the computer.

Further, an HDR-combined image generated by the external apparatus immediately before may be displayed on the above-mentioned video displaying area. In this case, the pixel values of the detected moving object, output from the moving object detection section 302, may be extracted from the displayed HDR-combined image. Further, the pixel values of the detected moving object, output from the moving object detection section 302, may be extracted from one or both of a plurality of captured images (a long exposure image and a short exposure image), which are images output from the image capture apparatus 100*b* for each frame.

Note that the instruction receiving section may be provided not in the external apparatus, but in the image capture apparatus 100*b*.

Further, in the present embodiment, the storage section existing in the above-described embodiments is not necessarily required. This is because it is unnecessary to store image data, captured or generated in the past, so as to detect a moving object.

Next, an example of the sequence for processing an exposure level difference calculation frame, and the sequence following this, for processing an exposure level difference reflection frame will be described with reference to FIG. 9.

Figure 9:
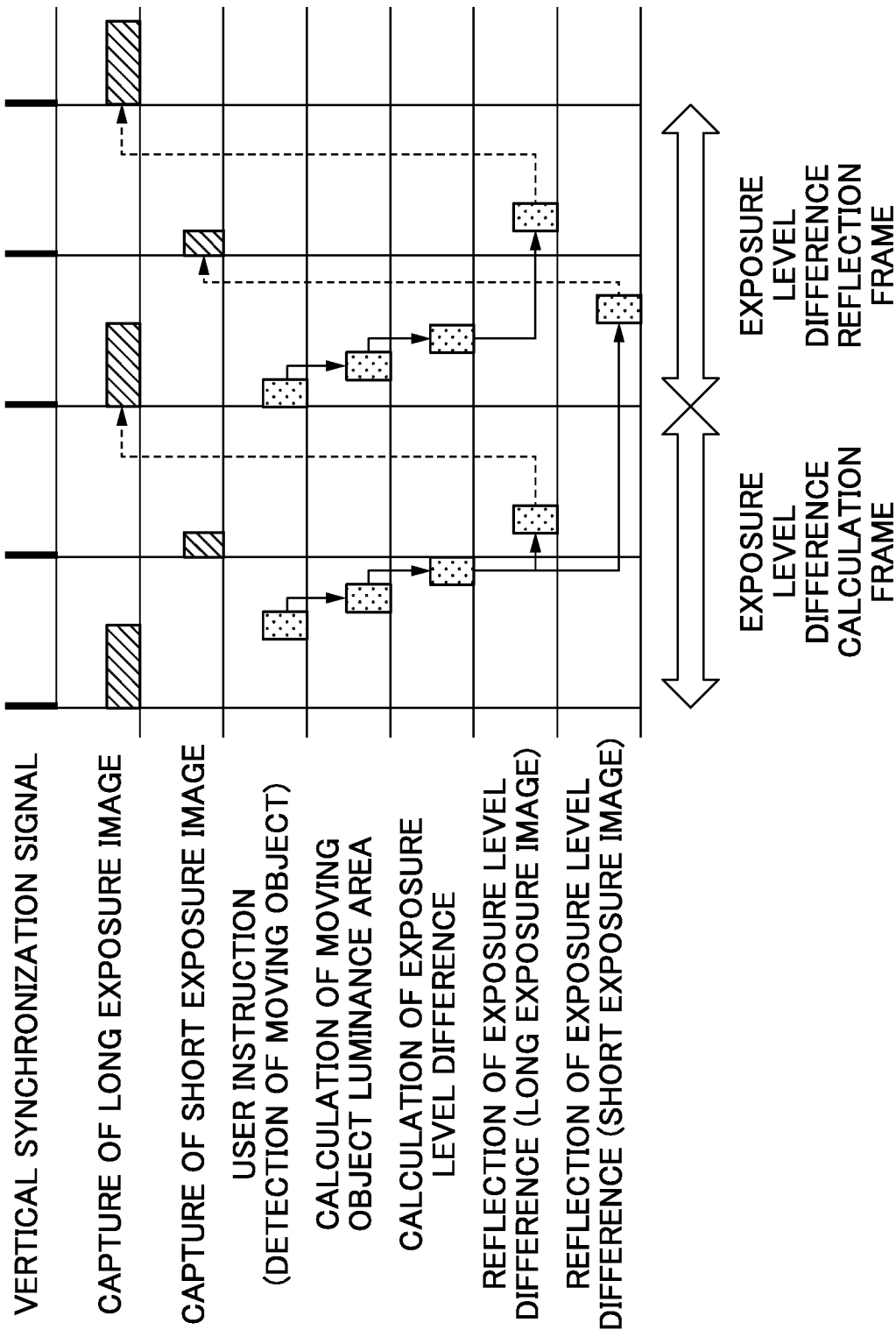
FIG. 9 is a diagram showing an example of a sequence for processing an exposure level difference calculation frame and a sequence following this, for processing an exposure level difference reflection frame, according to the third embodiment.

As shown in the sequence for processing an exposure level difference calculation frame in FIG. 9, detection of a moving object, and calculation of an exposure amount for capturing a long exposure image and an exposure amount for capturing a short exposure image (exposure level difference) are performed, in response to a user instruction asynchronously generated. Then, the exposure is controlled such that the calculated exposure amounts are reflected in the first capture timing after calculating the exposure amounts (i.e. in the exposure level difference reflection frame which is the next frame).

With this configuration, in the present embodiment, an area designated by the user is detected as a moving object. Then, the exposure amounts are determined so as to prevent generation of an improper combined image with ghost artifacts or the like in a portion of the area (moving object) designated by the user, and a plurality of images for HDR combination are captured.

With this, it is possible to prevent generation of an improper combined image with ghost artifacts or the like in an important area to which the user pays attention.

Next, an image capture apparatus 100*c* according to a fourth embodiment of the present invention and a method of controlling the same will be described with reference to FIG. 10.

In the above-described first to third embodiments, the exposure control parameters for capturing images for HDR combination are output to the image capture unit. In contrast, in the present embodiment, the exposure control parameters for capturing the next image for HDR combination are calculated whenever one image for HDR combination is captured, and the calculated exposure control parameters are output to the image capture unit. That is, in the same frame, the exposure control parameters for an even-numbered image capture operation are calculated based on a captured image obtained by an odd-numbered image capture operation.

Figure 10:
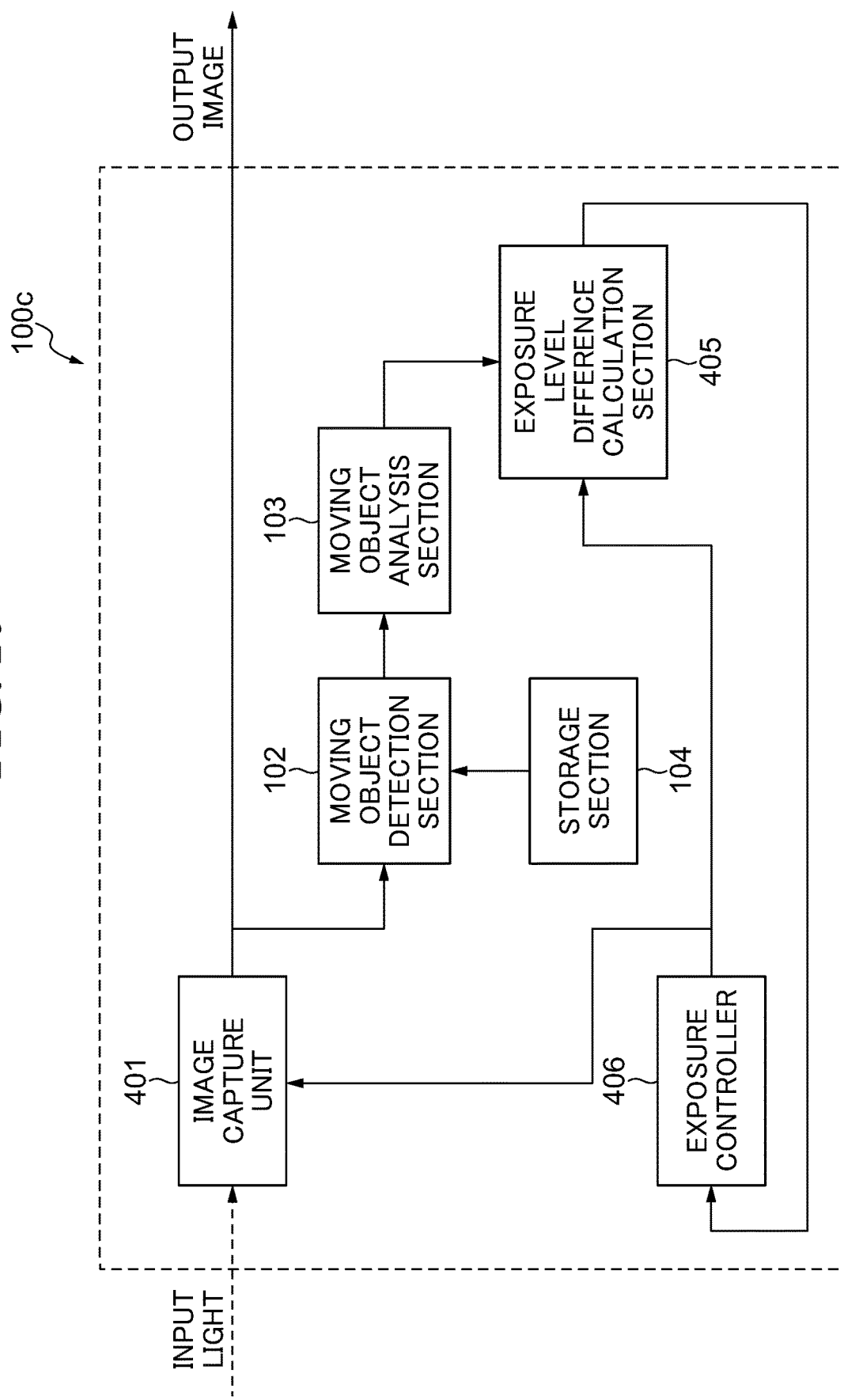
FIG. 10 is a control block diagram of an image capture apparatus according to a fourth embodiment of the present invention.

FIG. 10 is a control block diagram of the image capture apparatus 100c according to the present embodiment.

An image capture unit 401 performs image capture with exposure amounts determined based on the exposure control parameters acquired from an exposure controller 406 to generate captured image data items of a long exposure image and a short exposure image. Then, both of the generated image data items of the long exposure image and the short exposure image are output as the output images of the image capture apparatus 100c, and on the other hand, the image data of the long exposure image is also output to the moving object detection section 102. That is, the moving object detection section 102 detects a moving object only from the long exposure image, and the moving object analysis section 103 generates only a feature amount of the moving object (luminance histogram of the moving object pixels) extracted from the long exposure image.

An exposure level difference calculation section 405 acquires the feature amount of the moving object from the moving object analysis section 103, and the exposure control parameters for capturing a short exposure image in the immediately preceding frame from the exposure controller 406, and calculates, based on these information items, an exposure amount to be applied when the image capture unit 401 captures a short exposure image of the current frame. Then, the exposure level difference calculation section 405 outputs the calculated exposure amount to the exposure controller 406.

The exposure controller 406 calculates, based on the exposure amount acquired from the exposer level difference calculation section 405, the exposure control parameters for capturing a short exposure image, associated with the acquired exposure amount, and outputs the calculated exposure control parameters to the image capture unit 401.

Next, an example of a sequence of an exposure level difference calculation reflection process which is performed for each frame on a short exposure image, by the image capture apparatus according to the present embodiment, will be described with reference to FIG. 11.

Figure 11:
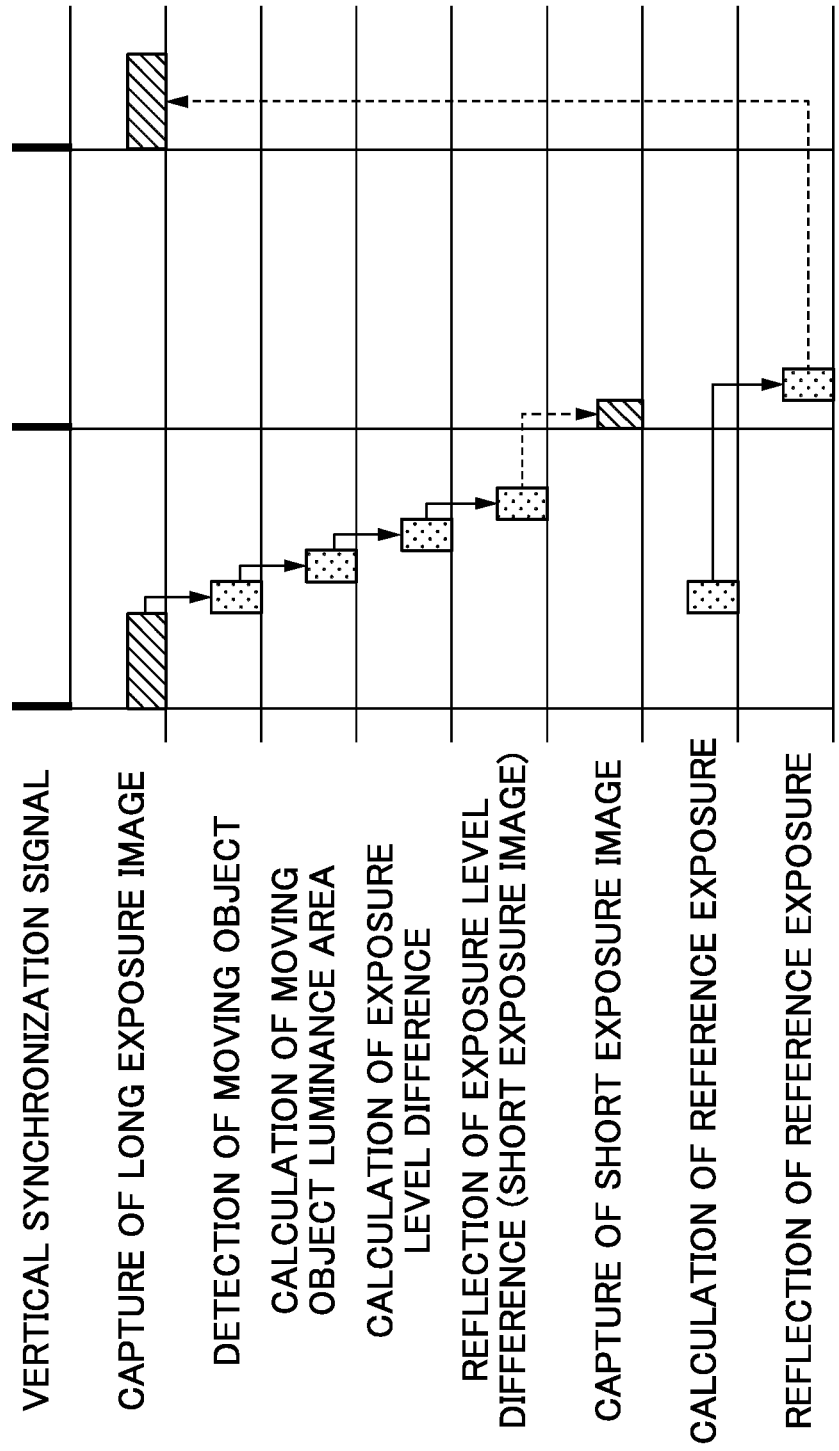
FIG. 11 is a diagram showing an example of a sequence of an exposure level difference calculation reflection process which is performed on a short exposure image by the image capture apparatus according to the fourth embodiment for each frame.

As shown in FIG. 11, in the present embodiment, when a long exposure image is captured, a moving object is detected based on the captured image data of the long exposure image, and the whole range of the moving object luminance area is calculated based on the feature amount of the detected moving object. Next, the exposure amount for capturing a short exposure image of the current frame is calculated based on the calculated moving object luminance area, and the calculated exposure amount is reflected on the image capture operation of the short exposure image of the current frame.

Figure 12:
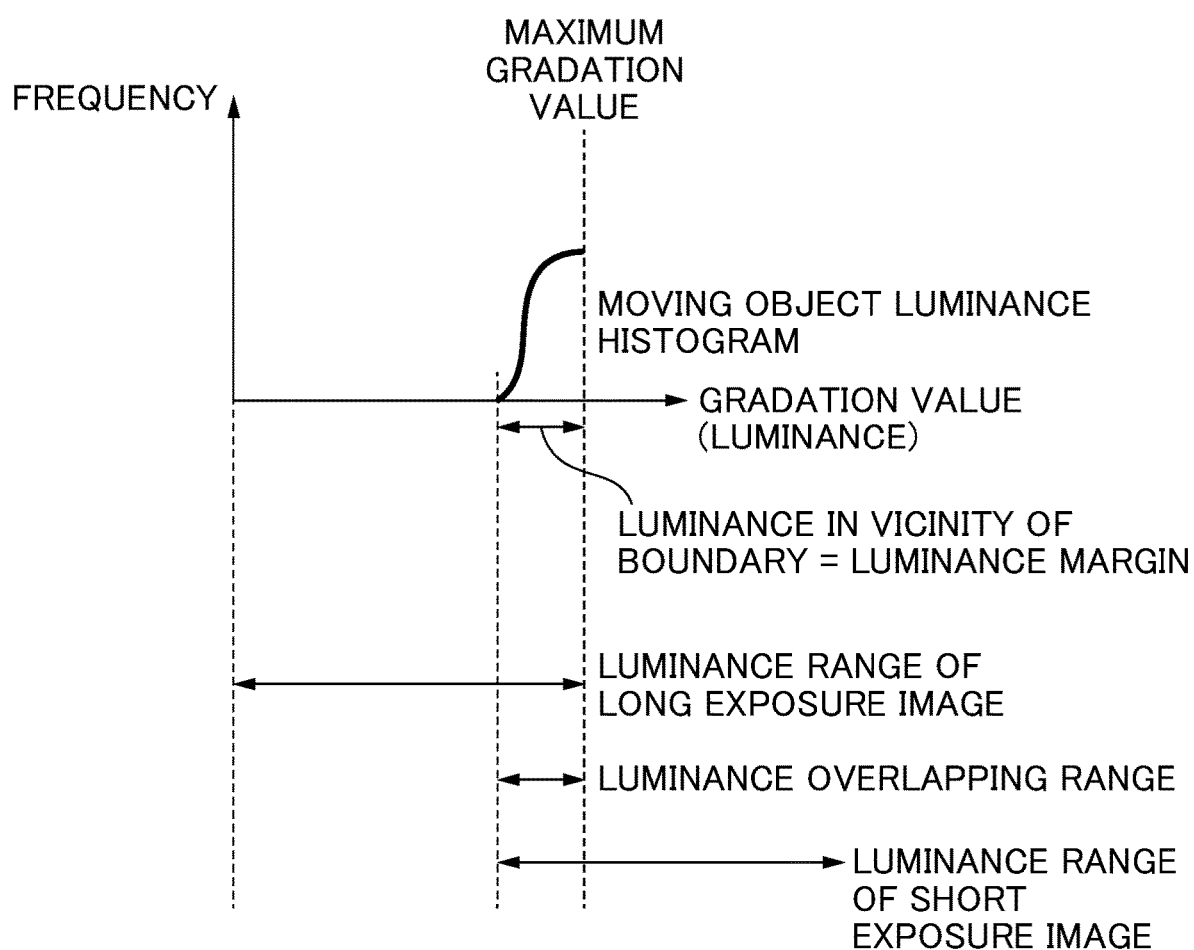
FIG. 12 is a diagram useful in explaining a sequence for processing an exposure level difference calculation frame in FIG. 11.

The method of determining the exposure amount for capturing the short exposure image of the current frame based on the captured image data of the long exposure image of the current frame will be described with reference to FIG. 12.

First, a moving object is detected from the captured image luminance range of the long exposure image (range indicated by an arrow indicating "luminance range of long exposure image"), captured with an exposure amount determined based on exposure control parameters acquired from the exposure controller 406. After that, a luminance histogram of moving object pixels is generated ("moving object luminance histogram" in FIG. 12). At this time, there is a case where the luminance of the moving object is distributed in the vicinity of the maximum gradation value (luminance), as in the case of the "moving object luminance histogram" in FIG. 12. In this case, it is possible to estimate that the luminance of the moving object is also distributed in the captured image luminance range of the short exposure image of the current frame (a range indicated by an arrow indicating "luminance range of short exposure image" in FIG. 12). In other words, there is a possibility that the moving object is included in both of the long exposure image and the short exposure image. As described hereinabove, if a long exposure image and a short exposure image each including a moving object, which were captured at different times, are combined, an improper combined image with ghost artifacts or the like can be undesirably generated. To prevent this, the exposure amount for capturing the short exposure image is determined such that the captured image luminance range of the short exposure image includes the luminance range of the moving object, detected from the long exposure image ("luminance overlapping range" in FIG. 12). This makes it possible to cause the whole luminance range of the moving object to be included in the luminance range of the short exposure image. For this reason, when performing HDR combination, it is possible to prevent an improper combined image portion with ghost artifacts or the like from being generated in a moving object portion by forming an HDR-combined image, using only a short exposure image with respect to the moving object portion.

Note that the exposure level difference calculation section 405 may set an exposure amount for capturing a long exposure image as the reference exposure, calculate an exposure amount based on a feature amount associated with the brightness of the long exposure image (e.g. a luminance histogram of a moving object), and cause the calculated exposure amount to be reflected on the exposure amount for capturing a long exposure image of the next frame. This makes it possible to capture images for HDR combination, while maintaining proper exposure.

Next, a description will be given of a fifth embodiment of the present invention. The present embodiment differs from the first embodiment only in details of the processing operations performed by the moving object analysis section and the exposure level difference calculation section, and hence illustration of the control block diagram is omitted.

The details of the processing operations in the present embodiment will be described with reference to FIG. 13.

In the present embodiment, a case is assumed where the luminance range of a moving object is divided into two areas and a luminance difference between the two divided areas is so large that the whole luminance range of the moving object cannot be covered by a captured image luminance range of one of a plurality of captured images for HDR combination.

Figure 13A:
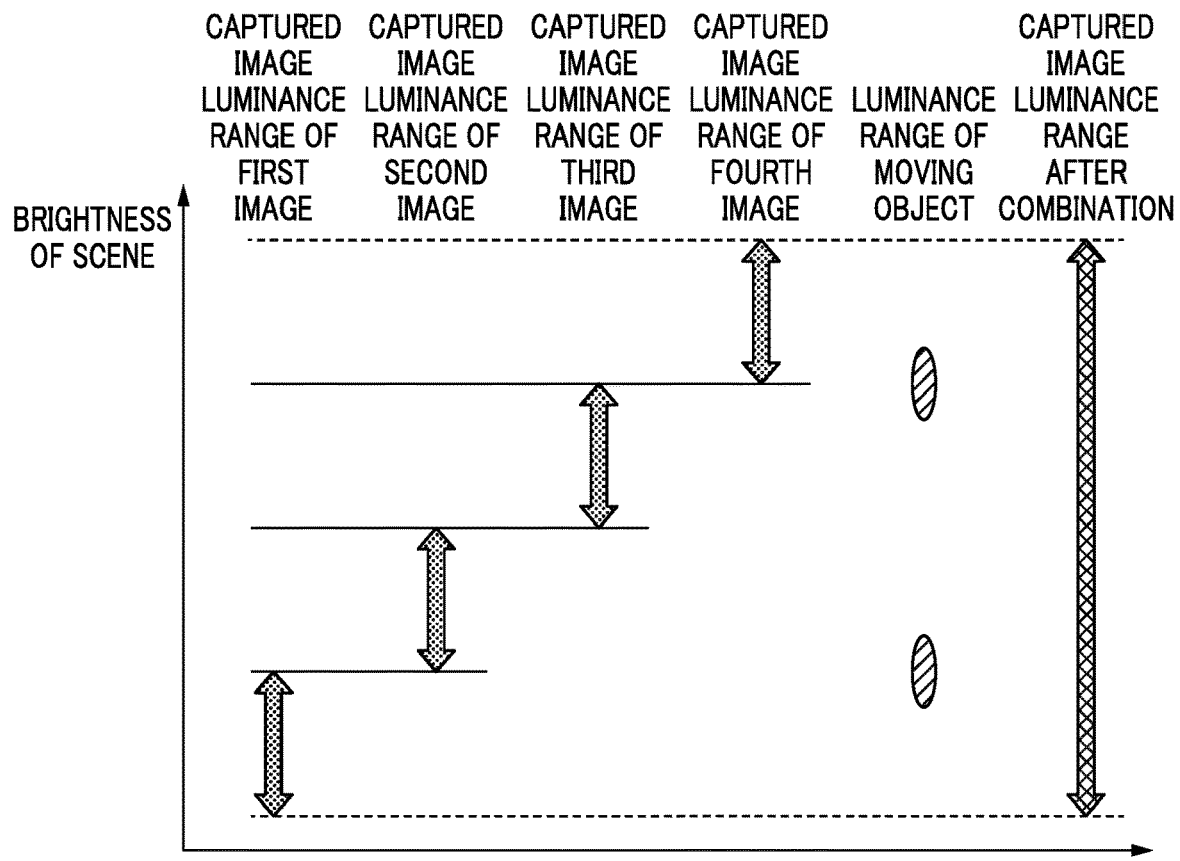
FIGS. 13A and 13B are diagrams useful in explaining exposure level difference control for an image capture apparatus according to a fifth embodiment of the present invention.

In a case where such a luminance range of the moving object is detected by the moving object analysis section 103, if HDR combination is performed so as to cover the whole luminance range of the moving object, as shown in FIG. 13A, the number of captured images to be combined is increased. For example, in a case where four images are combined as shown in FIG. 13A, four image capture operations are required to combine the images into one HDR-combined image, and hence the frame rate is lowered to ¼, compared with a case where HDR combination is not performed. Further, if the frame rate is lowered, the moving object does not appear to move smoothly, which lowers the visibility of the moving object.

Further, since it is impossible to cover the whole luminance range of the moving object with the captured image luminance range of one of a plurality of images for HDR combination, the images having the moving object captured at different times are combined, which generates an improper combined image portion with ghost artifacts or the like in the moving object portion. Further, there is an inconvenience that as the number of captured images is larger, a time interval between the capture times can become larger, and as the time interval between the capture times is larger, the width of ghost artifacts caused by combining the images becomes larger, and hence a feeling of interference caused by the ghost artifacts becomes large.

Figure 13B:
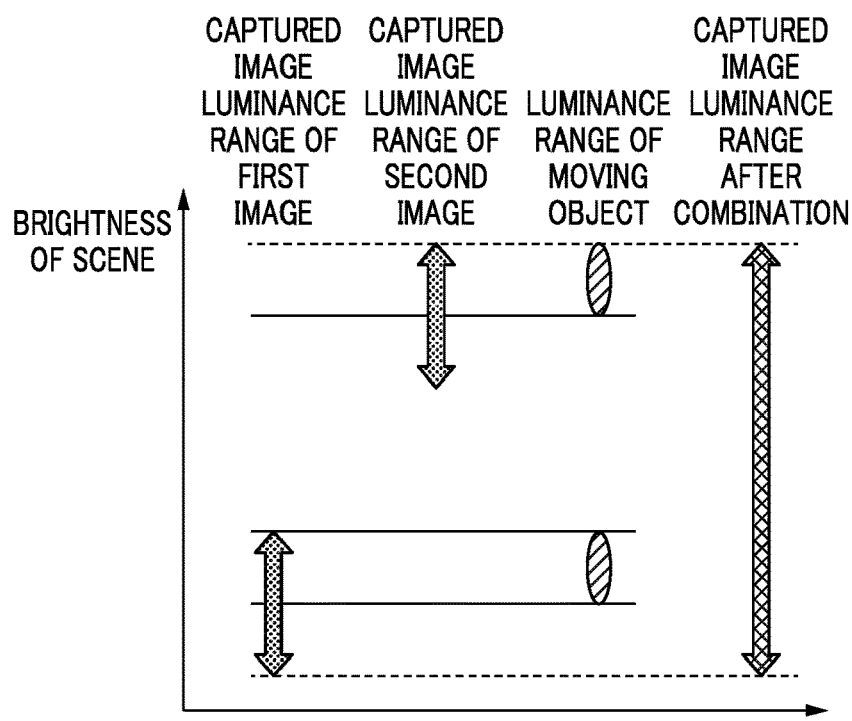

To prevent this, in the present embodiment, in a case where the luminance range of the moving object is divided into at least two or more areas, the moving object analysis section 103 determines whether or not a luminance difference between the divided areas corresponding to the moving object is very large (larger than a predetermined reference value). Then, if it is determined that the luminance difference is very large (larger than the predetermined reference value), the exposure level difference calculation section 105 determines the exposure level difference such that the captured image luminance ranges are discontinuous between the successive capture timings. In other words, exposure amounts are determined such that the whole captured image luminance range of the HDR-combined image is divided in accordance with the luminance ranges of the areas which correspond to the moving object. More specifically, as shown in FIG. 13B, the exposure level difference for capturing the first captured image is calculated such that the captured image luminance range of the first image includes one of the two divided areas and the exposure level difference for capturing the second captured image is calculated such that the captured image luminance range of the second image includes the other of the two divided areas.

By doing this, a difference between the times of capturing the moving object portion is reduced, which makes it possible to reduce the width of ghost artifacts caused by combining the images, and hence it is possible to reduce the feeling of interference caused by the ghost artifacts.

Further, the number of captured images is set to the minimum number required to capture the divided areas of the luminance range of the moving object. That is, in the case shown in FIG. 13B, the number of captured images is set to two.

Thus, it is possible to increase the frame rate by setting the number of captured images to the minimum number, which makes the motion of the moving object become natural and improves the visibility. In the examples shown in FIGS. 13A and 13B, in the case of FIG. 13B, the frame rate can be doubly increased, compared with the case in FIG. 13B.

Note that although the frame rate is not changed, if the order of acquiring a plurality of images for HDR combination is such that captured luminance areas corresponding to a moving object are preferentially captured, it is possible to reduce the time interval of capturing the moving object. For example, in a case where four image capture operations are separately performed to acquire images for HDR combination, image capture operations are successively performed for the captured luminance areas corresponding to the moving object portion. With this configuration, it is possible to reduce the unnaturalness of ghost artifacts in the moving object portion of the HDR-combined image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-180668 filed Sep. 26, 2018, which is hereby incorporated by reference herein in its entirety.

What is claimed is:

1. An image capture apparatus including:
    an image capture section configured to perform image capture operations with a plurality of different exposure amounts for each frame, to thereby generate a plurality of captured images so as to perform HDR combinations; and
    at least one processor or circuit configured to perform the operations of a plurality of units comprising:
    (1) a setting unit configured to set the plurality of different exposure amounts for the image capture section; and
    (2) a moving object detection unit configured to detect a moving object existing in at least one of the plurality of captured images,
    wherein the setting unit adjusts the plurality of different exposure amounts according to whether or not a moving object is detected by the moving object detection unit, and
    wherein the moving object detection unit detects, as the moving object, a difference between (a) an HDR-combined image obtained by HDR combination of the plurality of captured images and (b) a past HDR-combined image.

2. The image capture apparatus according to claim 1, wherein the at least one processor or circuit is configured to further perform the operation of a moving object analysis unit configured to analyze brightness of the moving object existing in each of the plurality of captured images, and
    wherein the setting unit adjusts the plurality of different exposure amounts according to the analyzed brightness.

3. The image capture apparatus according to claim 2, wherein the moving object analysis unit generates a histogram with respect to the luminance of the moving object detected from a captured image obtained by an odd-numbered image capture operation of a frame, and
> wherein the setting unit determines an exposure amount to be used for an even-numbered image capture operation of the frame according to distribution of the histogram.

4. The image capture apparatus according to claim 2, wherein in a case where the moving object analysis unit detects that the luminance range of the moving object is divided into two areas, and a luminance difference between the two divided areas is so large that the whole luminance range of the moving object cannot be covered by a captured image luminance range of one of the plurality of captured images, the setting unit adjusts the plurality of different exposure amounts such that the whole captured image luminance range of the HDR-combined image formed from the plurality of captured images is also divided in accordance with the luminance ranges of the two areas, between successive capture timings.

5. The image capture apparatus according to claim 4, wherein the number of the plurality of captured images is set to a minimum number required to capture the divided two areas.

6. The image capture apparatus according to claim 1, wherein the setting unit makes smaller a difference between a maximum value and a minimum value of the plurality of different exposure amounts in a case where the moving object is detected by the moving object detection unit, than in a case where the moving object is not detected by the moving object detection unit.

7. The image capture apparatus according to claim 1, wherein in a case where a moving object is detected by the moving object detection unit, the setting unit determines the plurality of different exposure amounts such that the number of images required to capture a luminance range of the moving object is made minimum.

8. The image capture apparatus according to claim 1, wherein the at least one processor or circuit is configured to further perform the operation of a background image calculation unit configured to calculate a background image obtained by calculating a time average of captured images of the same scene, which were generated by the image capture section in a past predetermined time period, and
> wherein the moving object detection unit detects, as the moving object, a difference between at least one of the plurality of captured images and the calculated background image.

9. The image capture apparatus according to claim 1, wherein the moving object detection unit detects an area, designated by a user, of the at least one image within an image capture angle of view of the image capture apparatus, as the moving object.

10. The image capture apparatus according to claim 1, wherein the setting unit adjusts the plurality of different exposure amounts such that a luminance range of one of the plurality of images includes the whole area of the luminance area of the moving object.

11. An image capture apparatus including:
> an image capture section configured to perform image capture operations with a plurality of different exposure amounts for each frame, to thereby generate a plurality of captured images so as to perform HDR combination; and
> at least one processor or circuit configured to perform the operations of a plurality of units comprising:
>> (1) a setting unit configured to set the plurality of different exposure amounts for the image capture section; and
>> (2) a moving object detection unit configured to detect a moving object existing in at least one of the plurality of captured images,
>
> wherein the setting unit adjusts the plurality of different exposure amounts according to whether or not a moving object is detected by the moving object detection unit, and
> wherein in a case where the number of the plurality of captured images is three or more, the setting unit adjusts the exposure amounts except a maximum exposure amount and a minimum exposure amount out of the plurality of exposure amounts.

12. A method of controlling an image capture apparatus, the image capture apparatus including an image capture section configured to perform image capture operations with a plurality of different exposure amounts for each frame, to thereby generate a plurality of captured images so as to perform HDR combination, the method comprising:
> setting the plurality of different exposure amounts for the image capture section;
> detecting a moving object existing in at least one of the plurality of captured images; and
> adjusting the plurality of different exposure amounts according to whether or not a moving object is detected,
> wherein the detecting detects, as the moving object, a difference between (a) an HDR-combined image obtained by HDR combination of the plurality of captured images and (b) a past HDR-combined image.

13. A non-transitory computer-readable storage medium storing a computer-executable program for executing a method of controlling an image capture apparatus, the image capture apparatus including an image capture section configured to perform image capture operations with a plurality of different exposure amounts for each frame, to thereby generate a plurality of captured images so as to perform HDR combination, wherein the method comprises:
> setting the plurality of different exposure amounts for the image capture section;
> detecting a moving object existing in at least one of the plurality of captured images; and
> adjusting the plurality of different exposure amounts according to whether or not a moving object is detected,
> wherein the detecting detects, as the moving object, a difference between (a) an HDR-combined image obtained by HDR combination of the plurality of captured images and (b) a past HDR-combined image.

* * * * *